United States Patent
Khare et al.

(10) Patent No.: US 6,615,319 B2
(45) Date of Patent: Sep. 2, 2003

(54) DISTRIBUTED MECHANISM FOR RESOLVING CACHE COHERENCE CONFLICTS IN A MULTI-NODE COMPUTER ARCHITECTURE

(75) Inventors: Manoj Khare, Saratoga, CA (US); Lily P. Looi, Portland, OR (US); Akhilesh Kumar, Sunnyvale, CA (US); Faye A. Briggs, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/752,937

(22) Filed: Dec. 29, 2000

(65) Prior Publication Data
US 2002/0087804 A1 Jul. 4, 2002

(51) Int. Cl.[7] .............................................. G06F 12/00
(52) U.S. Cl. ..................... 711/141; 711/146; 711/124
(58) Field of Search ................................ 711/147, 148, 711/150, 151, 141, 146; 709/213, 214, 216

(56) References Cited

U.S. PATENT DOCUMENTS

| | | | | | |
|---|---|---|---|---|---|
| 5,832,304 | A | * | 11/1998 | Bauman et al. | 711/151 |
| 6,065,077 | A | * | 5/2000 | Fu | 711/110 |
| 2001/0013089 | A1 | * | 8/2001 | Weber | 711/146 |

* cited by examiner

Primary Examiner—Jack A. Lane
(74) Attorney, Agent, or Firm—Blakely, Sokoloff, Taylor & Zafman LLP

(57) ABSTRACT

According to one embodiment, a method is disclosed. The method comprises receiving a read request from a first node in a multi-node computer system to read data from a memory at a second node. Subsequently, a write request from a third node is received to write data to the memory at the second node. The read request and write request is detected at conflict detection circuitry. Finally, read data from the memory at the second node is transmitted to the first node.

21 Claims, 7 Drawing Sheets

DISTRIBUTED MECHANISM FOR RESOLVING CACHE COHERENCE CONFLICTS IN A MULTI-NODE COMPUTER ARCHITECTURE

FIELD OF THE INVENTION

The present invention relates to computer systems; more particularly, the present invention relates to resolving cache coherence conflicts in a computer system.

BACKGROUND

In the area of distributed computing when multiple processing nodes access each other's memory, the necessity for memory coherency is evident. Various methods have evolved to address the difficulties associated with shared memory environments. One such method involves a distributed architecture in which each node on the distributed architecture incorporates a resident coherence manager. Because of the complexity involved in providing support for various protocol implementations of corresponding architectures, existing shared memory multiprocessing architectures fail to support the full range of MESI protocol possibilities. Instead, existing shared memory multiprocessor architectures rely on assumptions so as to provide a workable although incomplete system to address these various architectures.

One of the fundamental flaws of these existing memory sharing architectures is that a responding node, containing modified data for a cache line where the home storage location for the memory in question resides on a different node, is expected only to provide a passive response to a read request. No mechanism is built into the architectures to provide intelligent handling of the potential conflict between back-to-back read and write requests to the same line of memory. Therefore, a distributed mechanism for resolving cache coherence conflicts in a multiple processing node architecture is desired.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A method and apparatus for resolving cache coherence conflicts in a multi-node computer architecture is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
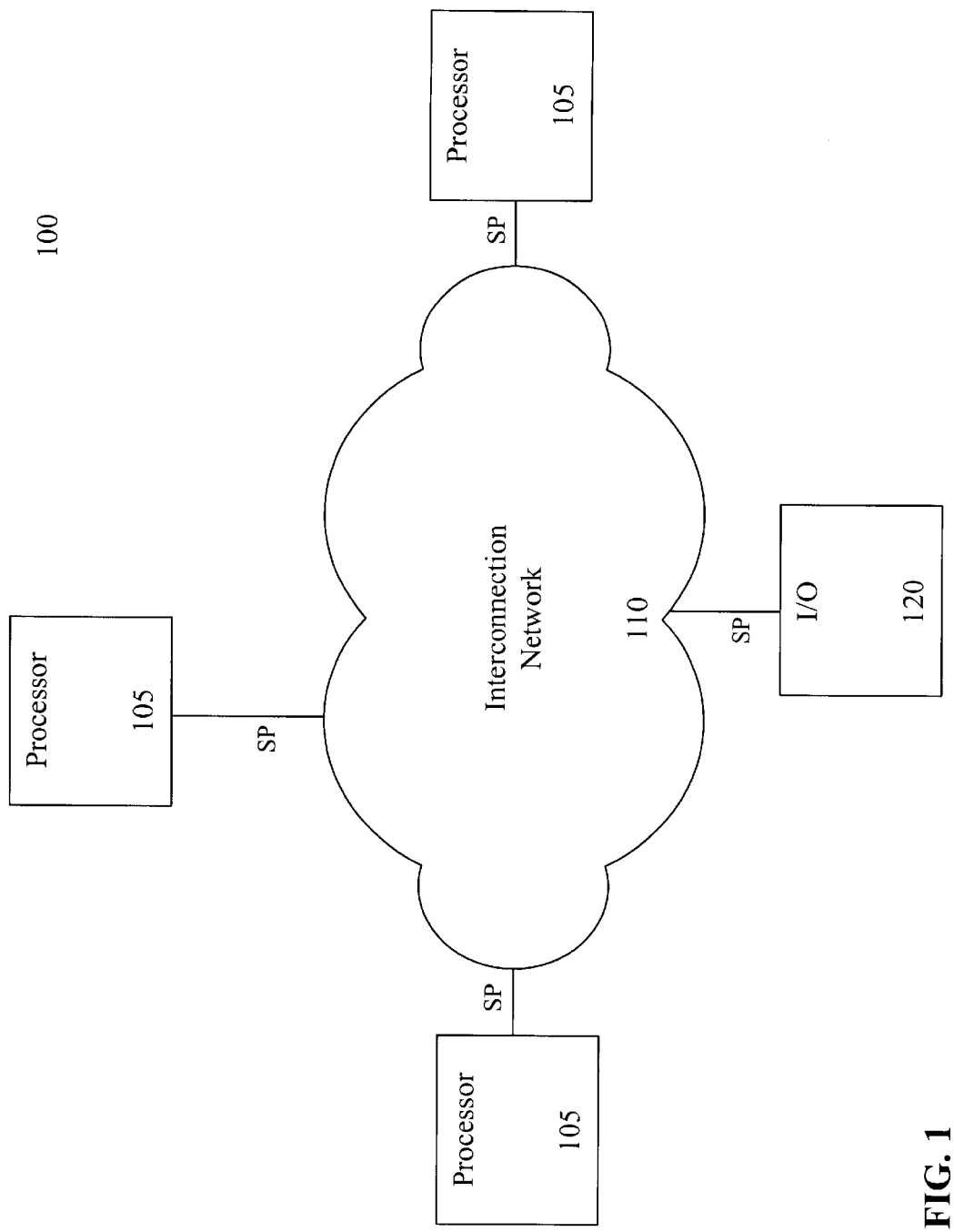
FIG. 1 illustrates one embodiment of a computer system.

FIG. 1 illustrates one embodiment of a computer system 100. Computer system 100 includes an interconnection network 110. According to one embodiment, network 110 includes switches coupled to a multitude of network nodes. The network nodes in computer system 100 include processor nodes 105 and one or more input/output (I/O) nodes 120 coupled via network 110. According to a further embodiment, each processor node 105 and I/O node 120 are coupled to network 110 via a scalability port.

A scalability port (SP) is an inter-node interface used to enable the implementation of a shared memory architecture, multi-processor system. The scalability port is a point to point cache coherent interface for interconnection of processor nodes 105 with local memory, I/O nodes 120 and network switches. Cache coherence is a mechanism to provide a consistent view of memory in a shared memory system with multiple caching agents that could have copies of data in private caches. Any updates to the memory block must be done in a manner that is visible to all of the caching agents. Although computer system 100 has been shown with three processor nodes and one I/O node, computer system 100 can be implemented with other quantities of processor and I/O nodes.

According to one embodiment, the functionality of the SP is portioned into three layers. Each layer performs a well-defined set of protocol functions. The layering results in a modular architecture that is easier to specify, implement and validate. The layers from bottom to top are the physical layer, the link layer and the protocol layer. The physical layer is a point to point interface between any two SP agents. The physical layer is responsible for electrical transfer of information on a physical medium. The electrical transfer is achieved by not requiring the physical layer to support any protocol level functionality.

The link layer abstracts the physical layer from the protocol layer, thus, guaranteeing reliable data transfer between agents on a SP. In addition, the link layer is responsible for flow control between the two agents on a SP and provides virtual channel services to the protocol layer. Virtual channels allow sharing of the physical channel by different protocol level messages for cache coherence.

The protocol layer implements the platform dependent protocol engines for higher level communication protocol between nodes such as cache coherence. According to one embodiment, the protocol layer uses packet based protocol for communication. The protocol layer formats a packet (e.g., request, response, etc.) that needs to be communicated and passes it to the appropriate virtual channel in the link layer. The protocol layer is bypassed in pure routing agents resulting in low latency transfer from sender to the receiver through the network.

Figure 2:
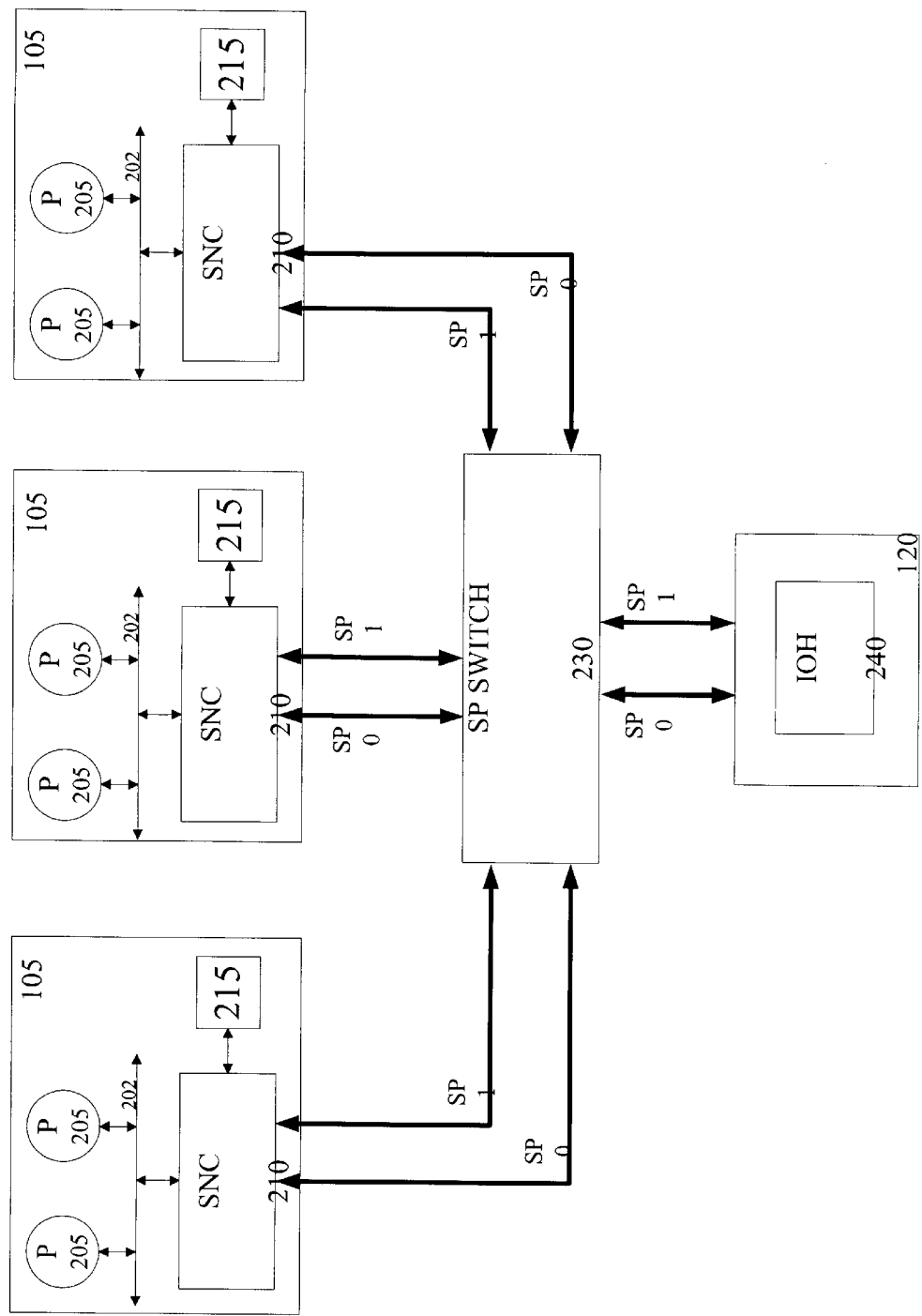
FIG. 2 is a block diagram of one embodiment of a computer system.

According to a further embodiment, 40 bits of protocol level information is communicated on physical transfers at the physical layer. The physical unit of data transfer is referred as a phit. The link layer between two point to point agents on a SP communicates on a higher granularity referred as flit or the independent unit of flow control. Each flit is 4 phits long. As described above, the protocol layer communicates using a packet based protocol. Each packet consists of multipleflits FIG. 2 is a block diagram of one embodiment of computer system 100. In such an embodiment, computer system 100 includes processor nodes 105a–105c coupled to I/O node 120 via a SP switch 230. According to one embodiment, each processor node 105 includes two central processing units (processors) 205 coupled to a processor bus 202. In one embodiment, processors 205 are processors in the Pentium® family of processors including the Pentium® II family and mobile Pentium® and Pentium® II processors available from Intel Corporation of Santa Clara, Calif. Alternatively, other processors may be used. According to a further embodiment, each processor 205 includes a second level (L2) cache memory (not shown in FIG. 2).

Each processor node 105 also includes a system node controller (SNC) 210 coupled to processor bus 202. SNC 210 is used to interface processor node 105 to SPs. In one embodiment, SNC 210 is implemented with the 870 chip set available from Intel Corporation; however, other chip sets can also be used. SNC 210 may include a memory controller (discussed below) for controlling a main memory 215 coupled to SNC 210.

Main memory 215 is coupled to processor bus 202 through SNC 210. Main memory 215 stores sequences of instructions that are executed by processor 105. In one embodiment, main memory 215 includes a dynamic random access memory (DRAM) system; however, main memory 215 may have other configurations. The sequences of instructions executed by processors 205 may be retrieved from main memory 215, or any other storage device. According to a further embodiment, each memory 215 within the various processor nodes 105 are uniformly addressable. As a result, a processor 205 within one processor node 105 may access the contents of a memory 215 within another processor node 105.

SP switch 230 is coupled to each processor node 105 via a SP0 and a SP1. In addition, SP switch 230 is coupled to I/O node 120 a via SP0 and a SP1. I/O node 120 includes an I/O hub (IOH) 240. According to one embodiment, there is a single protocol layer for SP0 and SP1. However, SP0 and SP1 have separate link and physical layers. IOH 240 provides an interface to I/O devices within computer system 100. For example, IOH 240 may be coupled to a network interface card (not shown).

SP switch 230 operates according to a central snoop coherence protocol. The central snoop coherence protocol is an invalidation protocol where any caching agent that intends to modify a cache line acquires an exclusive copy in its cache by invalidating copies at all the other caching agents. The coherence protocol assumes that the caching agents support some variant of a MESI coherence protocol, where the possible states for a cache line are Modified, Exclusive, Shared or Invalid.

The coherence protocol provides flexibility in snoop responses such that the protocol layer at the SP switch 230 can support different types of state transitions. For example, a cache line in the Modified state can transition either to a Shared state on a remote snoop or an Invalid state on a remote snoop, and the snoop response on the SP can indicate this for appropriate state transitions at SP switch 230 and the requesting agent. SP switch 230 includes a snoop filter (not shown). The snoop filter is organized as a tag cache that keeps information about the state of a cache line and a bit vector (presence vector) indicating the presence of the cache line at the caching nodes. In one embodiment, the presence vector has one bit per caching node in the system. If a caching agent at any node has a copy of the cache line, the corresponding bit in the presence vector for that cache line is set. A cache line could be either in Invalid, Shared, or Exclusive state in the snoop filter.

According to a further embodiment, the snoop filter is inclusive (e.g., without data, only the tag and state) of caches at all the caching agents. Thus, a caching agent does not have a copy of a cache line that is not present in the snoop filter. If a line is evicted from the snoop filter, it is evicted from the caching agents of all the nodes (marked in the presence vector). In other embodiments where multiple SP switches 230 may be included, the snoop filter is divided amongst the multiple SP switches 230 or into multiple caches within one switch 230 in order to provide sufficient snoop filter throughput and capacity to meet the system scalability requirement. In such embodiments, different snoop filters keep track of mutually exclusive set of cache lines. A cache line is tracked at all times by only one snoop filter.

The state of a cache line in the snoop filter is not always the same as the state in the caching agents. Because of the distributed nature of the system, the state transitions at the caching agents and at the snoop filter are not synchronized. Also, some of the state transitions at the caching agents are not externally visible and therefore the snoop filter may not be updated with such transitions. For example, transitions from Exclusive to Modified state and replacement of cache lines in Shared or Exclusive state may not be visible external to the caching agent.

In the Invalid state, the snoop filter is unambiguous. Thus, the cache line is not valid in any caching agent. All bits in the presence vector for the line in the snoop filter are reset. An unset bit in the presence vector in the snoop filter for a cache line is unambiguous. Consequently, the caching agent at the node indicated by the bit does not have a valid copy of the cache line. A cache line in Shared state at the snoop filter may be either in Shared or Invalid state at the caching agents at the node indicated by the presence vector in the Snoop Filter. A cache line in Exclusive state at the Snoop Filter may be in any (Modified, Exclusive, Shared or Invalid) state at the caching agents at the node indicated by the presence vector in the Snoop Filter.

Figure 3:
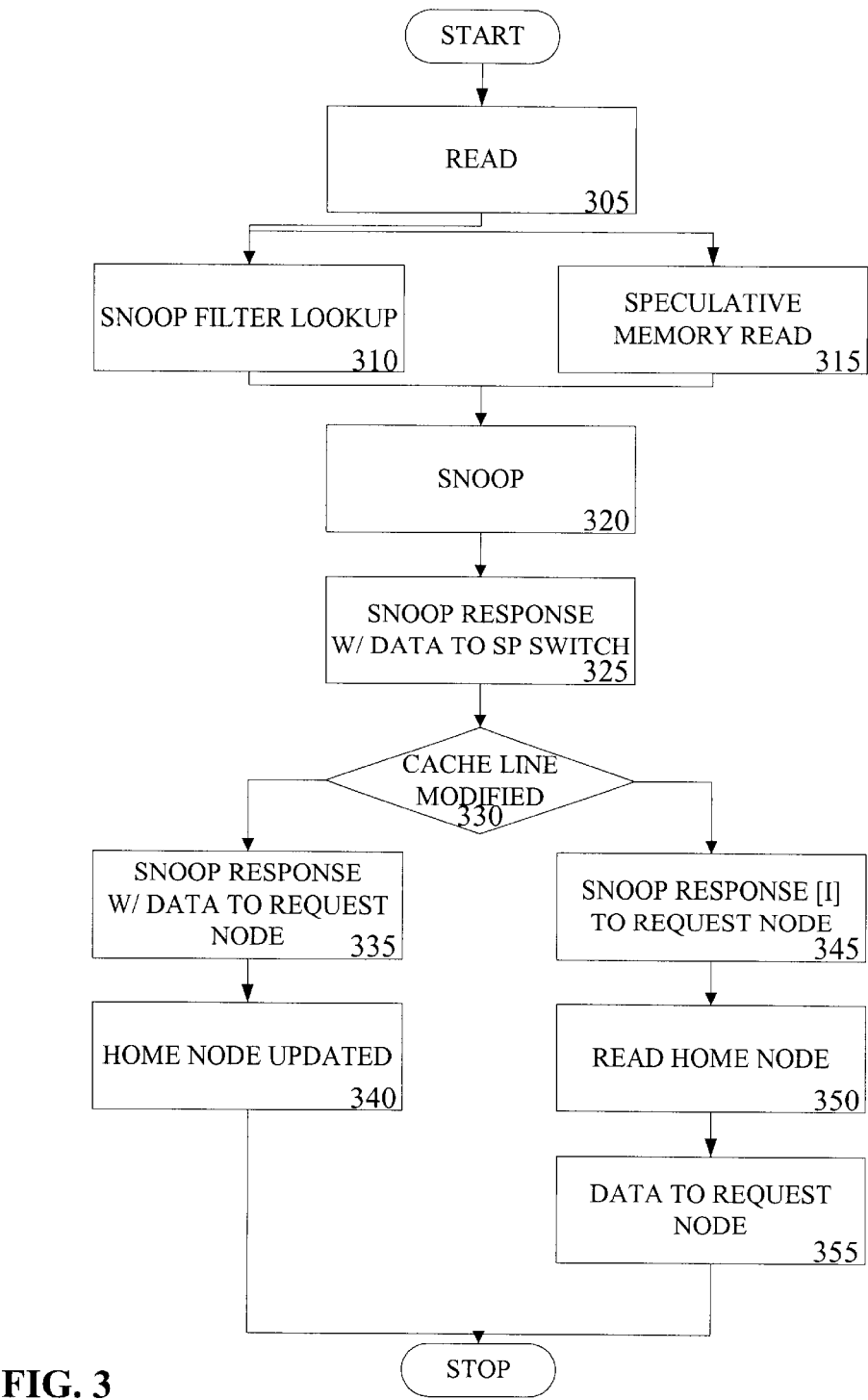
FIG. 3 is a flow diagram for one embodiment of cache coherence for a memory read command at a computer system.

FIG. 3 is a flow diagram for one embodiment of cache coherence for a memory read request from a node requesting access (e.g., processor node 105a) to a memory 215 at a node containing the requested logical address (e.g., the memory 215 at processor node 105c(or home node)) wherein a cache line corresponding to the logical address of the memory 215 has been modified at a remote modified node (e.g., processor node 105b).

Upon a read request by the request node, a cache line in the remote modified node corresponding to the requested home node memory 215 line may have been modified. Therefore, the cache line in the modified node is checked before the request node reads data from the home node. Referring to FIG. 3, a port read request is received at SP switch 230 from the request node (e.g., node 105a) at process block 305. The port read request is used to read a cache line. In particular, the port read is used to both read from memory and snoop the cache line in the caching agent(s) at the modified node. The port read request is targeted to the coherence controller or the home node of a memory block. A node that is not home of the block addressed by the transaction does not receive a port read request.

At process block 310, SP switch 230 executes a search of its internal snoop filter (e.g., a snoop filter lookup) to determine if the modified node (e.g., node 105b) contains a modified cache line corresponding to the requested memory address. At process block 315, a speculative read request is transmitted to the home node (e.g., node 105c). The speculative read request is used to read the home memory 215. In one embodiment, the speculative read request can be dropped by the responding agent without any functional issue. At process block 320, a port snoop request is transmitted from SP switch 230 to the remote modified node. The snoop request is used to snoop a memory block at a caching node. As a result of the snoop request, data may be supplied to both the source node and the home memory is updated.

At process block 325, a port snoop result and read data is transmitted from the modified node to the SP switch 230. The port snoop result is used to convey the result of snoop back to the node A. According to one embodiment, the port snoop result response indicates whether the line was found in a Modified state. If the cache line is found in a modified state, the cache holds the most recent version of data. If not, the data in the home node is the most recent, and the cache line is invalidated. At process block 330, it is determined whether the data in the cache line has been modified.

If it is determined that the cache line at the remote modified node has been modified, the port snoop result and read data is transmitted from the SP switch 230 to the request node, process block 335. At process block 340, the memory 215 within the home node is updated to reflect the up to date data from the modified remote node cache. However, if the snoop result indicates that the state of the cache line has not been modified, the snoop result received at SP switch 230 is returned as invalid. As a result, the invalid snoop result is transmitted from the SP switch 230 to the request node, process block 345. At process block 350, a read access is executed at the memory 215 within the home node. At process block 355, the read data is transmitted from the home node to the request node via SP switch 230.

A read-write conflict may occur when a cache line in a node (e.g., the remote modified node) is in the Modified state. As described above, if the request node makes a request for a copy of the line, the coherence protocol must make sure that the data supplied to node A is the most current data which may be in the Modified node. However, it is possible that while the request for a copy of the cache line is being processed (e.g., after the snoop filter look up), the processor with the copy of the cache line at the modified node may decide to write over the cache line. If the request from the request node is allowed to proceed between the interval of writing over the modified line from the modified node and memory 215 update at the home node, node A may get a stale copy of the line from the memory 215.

Figure 4:
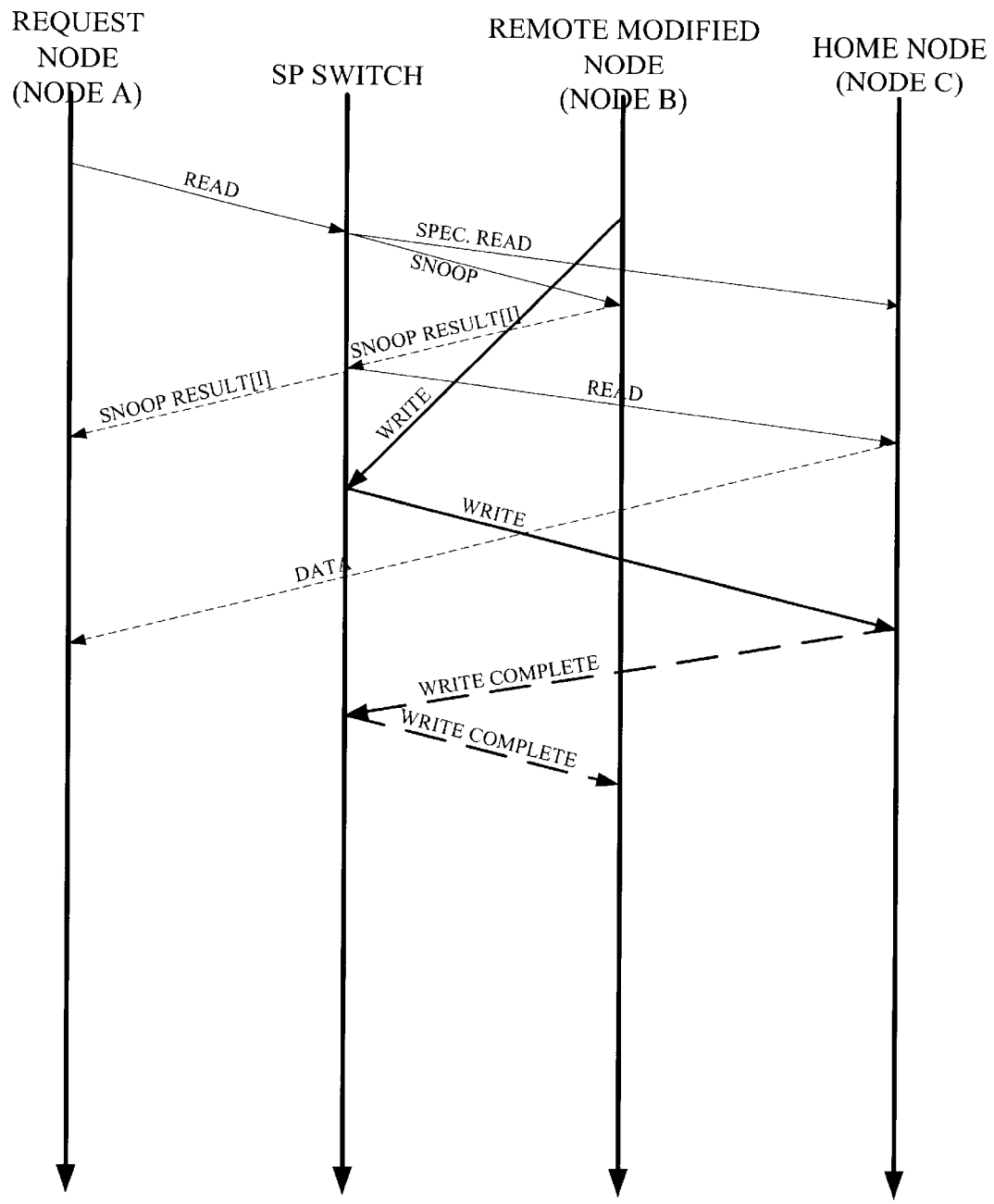
FIG. 4 is a timing diagram for a read-write conflict.

FIG. 4 is a timing diagram for one scenario of a read-write conflict. The vertical arrows show the flow of time at node A, node B, node C and SP switch 230. The arrows connecting vertical lines indicate the requests and responses over the SP. The solid arrows indicate the requests going over a request channel and the broken arrows indicate responses going over a response channel on the SP.

Assuming that node B has the modified copy of a line and node A makes a read request for a copy. If the request from node A reaches the snoop filter in SP switch 230 before a write from node B, the read request from node A will initiate a snoop request to node B. Thus, if no conflict detection mechanism is implemented, the read request may not see the on-going write from node B and may respond to the snoop with a snoop result. The snoop result response from node B going over the response channel may bypass the write from node B going over the request channel. Once a snoop result from node B for the read request from node A is received by SP switch 230, it will read the cache line from the memory 215 at the home node and supply it as data to node A. The line read from the memory 215 at the home node does not have the most recent data. Accordingly, an incoherent system state occurs.

According to one embodiment, computer system 100 includes a conflict detection mechanism for instances where coherent agents in computer system 100 generate transactions addressed to the same cache line. The mechanism orders the transactions in such a way that the coherency is not violated. In one embodiment, the detection and resolution of conflicts among concurrent requests from multiple nodes is done at SNC 210 and SP switch 230. As described above, concurrent accesses from multiple nodes to the same cache line creates a problem if the requests are conflicting in nature. Two requests are considered conflicting with each other if simultaneous processing of these requests will cause the system to get into an incoherent state, or result in loss of most up-to-date data.

Figure 5:
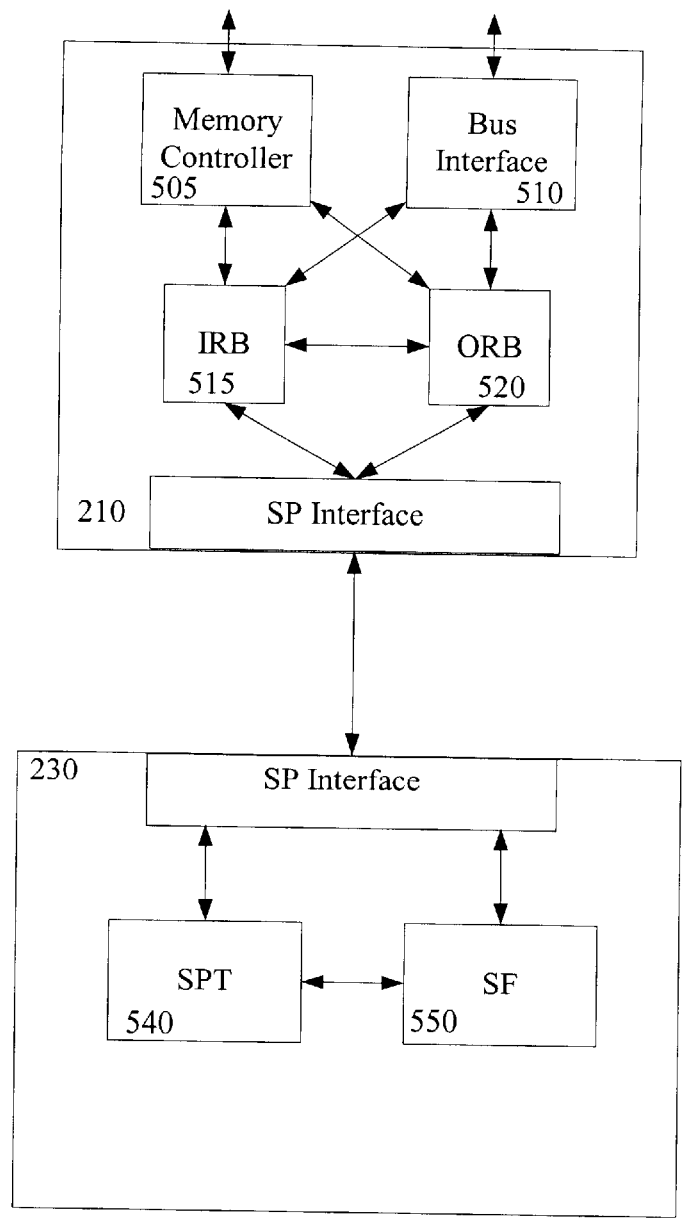
FIG. 5 is a block diagram of one embodiment of a conflict detection mechanism.

FIG. 5 is a block diagram of one embodiment of a conflict detection mechanism implemented within a SNC 210 within a processor node 105 and SP switch 230. SNC 210 includes a memory controller 505, a bus interface 510, an incoming request buffer (IRB) 515, an outgoing request buffer (ORB) 520 and an SP interface. Memory controller 505 accesses memory 215 for memory transactions based upon commands received from processors 105 within the same node, other node As 110 one or more peripheral devices coupled to IOH 240. Memory controller 505 may read data from, and write data to, memory 215.

Bus interface 510 provides the interface between SNC 210 and processor bus 202. IRB 515 is used to store SP requests initiated due to requests at remote nodes. These requests could be a memory access at the node, a snoop access to the caching agents at the node, or a combination of both. According to one embodiment, each IRB 515 entry includes the address, request type, snoop result, other state information and data. In a further embodiment, the conflict detection and resolution due to concurrent accesses to the same cache line at a node requires that some IRB 515 entries are blocked for some event at a conflicting ORB 520 entry. Thus, the number of entries in IRB 515 is larger than the number of entries in ORB 520 to prevent deadlocks.

ORB 520 includes a buffer that keeps track of outstanding coherent requests on the SP. In particular, the ORB 520 buffer keeps track of the address, transaction identifier, local snoop result, snoop and data response, completion response and a pointer to a pending snoop for that address due to a request generated at a remote node. According to one embodiment, ORB 520 has one outstanding transaction at any time for a particular cache line.

SP switch includes a snoop pending table (SPT) 540 and a snoop filter (SF) 550. As discussed earlier, SF 550 tracks the state of cache lines in the caching nodes. In particular SF 550 is inclusive of tags in the processor caches and is used to filter snoops from showing up at remote nodes that do not contain a copy of a particular data block. SPT 540 tracks transactions received at SP switch 230 from all ports until snooping has completed. In particular, SPT 540 orders multiple concurrent requests from different ports to the same cache line. In one embodiment, each SP 540 entry includes the address, the cache line state at SF 550 and the presence vector of the cache line.

Figure 6A:
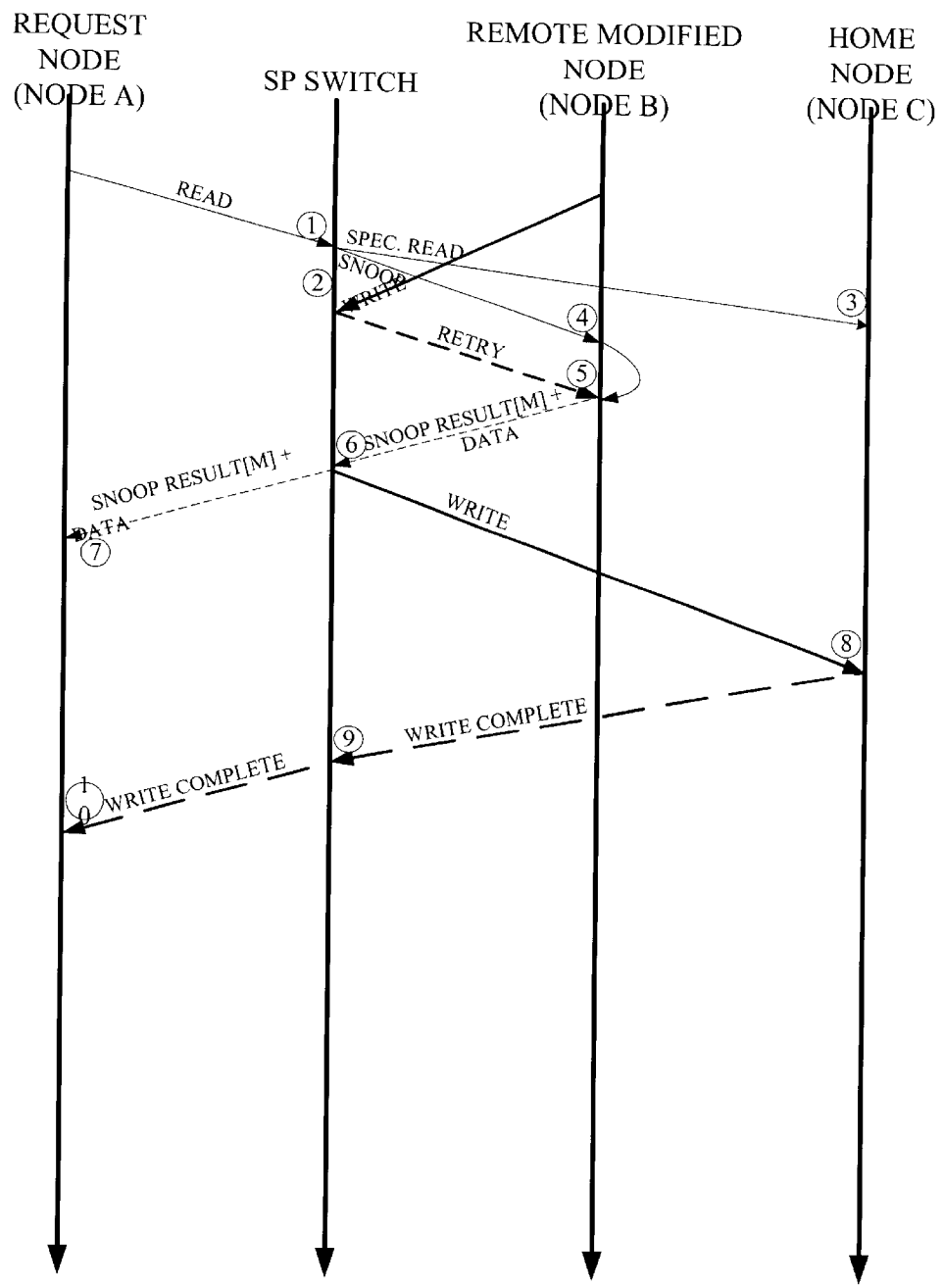
FIG. 6A is a timing diagram for one embodiment of detecting a read-write conflict.

With the implementation of the conflict detection mechanism, SP switch 230 and SNCs 210, the read-write conflict scenario shown in FIG. 4 can be detected and resolved based on the order in which SP switch 230 processes these requests. FIG. 6A is a timing diagram for one embodiment of detecting a read-write conflict. In this scenario, a port read request is received at SP switch 230 from node A at time t1, while the port write request is received from node B at time t2. The speculative read is transmitted from SP switch 230 to node B at time 3, and the snoop request is transmitted to the node C at time t4. Note that the snoop request is blocked from the IRB 515 within node B because of the write request for the same line being stored in the ORB 520. Accordingly, the snoop request cannot be completed until an acknowledgement is received at node B corresponding to the write request.

However, the conflict between the read and write is detected by SPT 540, thus, the write request is rejected. Consequently, a retry response is received back at node B at time t5. In response to receiving the retry response, the read snoop request may now be completed. At times t6 and t7 a snoop result indicating that the cache line at node B is in the Modified state is received at SP switch 230 and node A, respectively. Since the cache line has been modified, the data from the cache line is transmitted along with the snoop result. At time t8 the port write stored in SPT 540 is received at node C. At times t9 and t10 and acknowledgement that the write has been completed is received at SP switch 230 and node A, respectively.

Figure 6B:
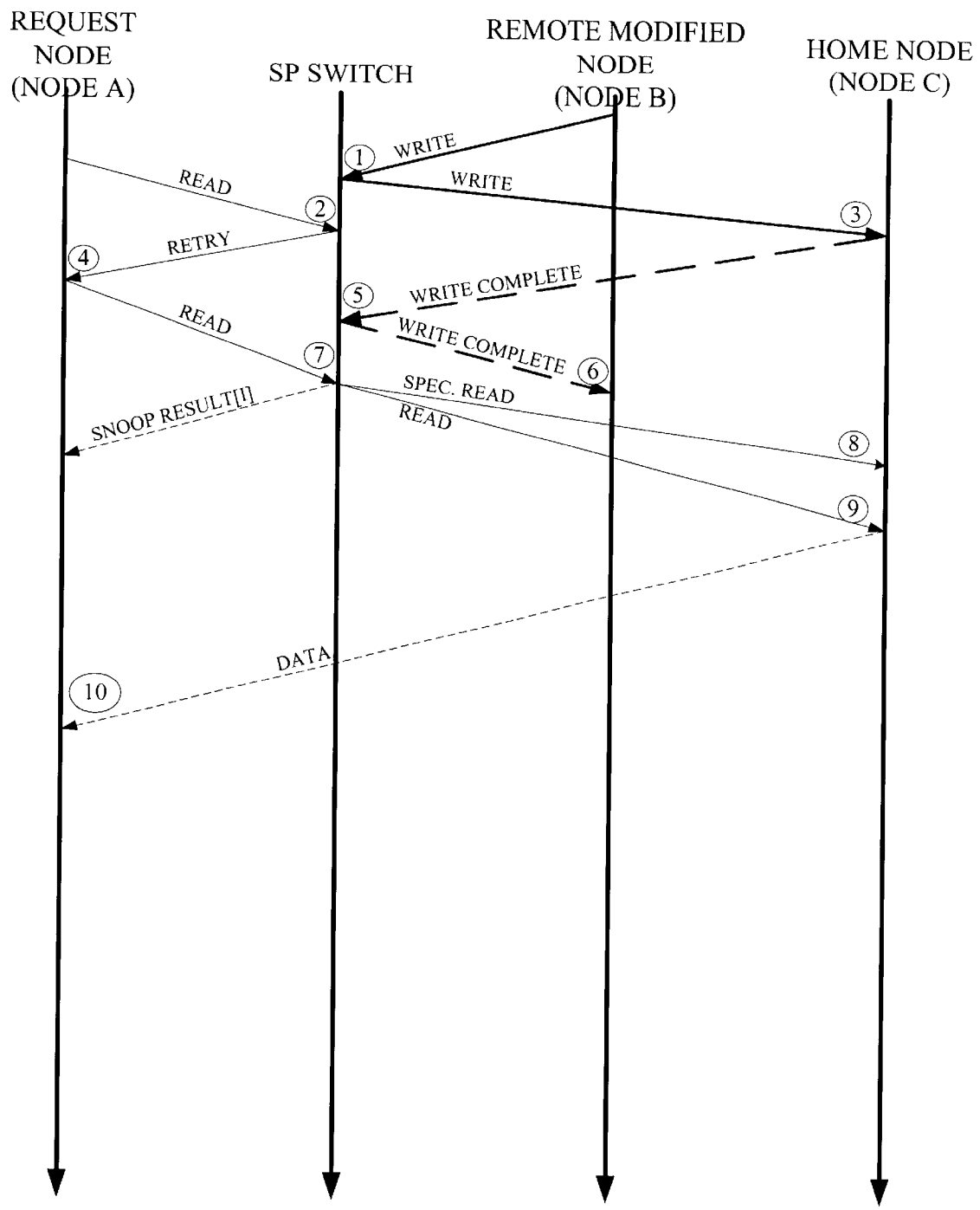
FIG. 6B is a timing diagram for another embodiment of detecting a read-write conflict.

FIG. 6B is a timing diagram for another embodiment of detecting a read-write conflict. In this scenario, a port write request is received at SP switch 230 from node B at time t1, and the port read request is received from node A at time t2. At time t3 the port write is received at node C. At time t4, a retry response is received back at node A because of the conflict between the read and write requests is detected by SPT 540. The read request is rejected since the write request was received first. At times t5 and t6 an acknowledgement that the write has been completed is received at SP switch 230 and node B, respectively.

After the write acknowledgement, the port read is again received at SP switch 230 at time t7. At times t7 and t8 a speculative read and read requests are received at node C from SP switch 230. At time t9 a snoop result indicating that the cache line at node B is in the Invalid state is received at SP switch 230 and node A, respectively. At time t10 the read is received at node A.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A method comprising:
   receiving a read request from a first processor node in a multi-node computer system via a point-to-point cache coherent interface to read data from a memory device at a second processor node, the interface comprising two or more layers having a separate set of protocol functions;
   receiving a write request from a third processor node via the interface to write data to the memory device;
   detecting the read request and write request at conflict detection circuitry; and
   transmitting data corresponding to the read request from the memory device to the first processor node via the interface.

2. The method of claim 1 further comprising transmitting a snoop request to the third node upon receiving the read request.

3. The method of claim 2 wherein the snoop request is blocked at the third node due to the pending write request.

4. The method of claim 3 further comprising transmitting a retry acknowledgement to the third node upon receiving the write request.

5. The method of claim 4 wherein the read request is unblocked at the third node upon receiving the retry acknowledgement.

6. The method of claim 2 wherein the result of the snoop request is transmitted to the first node with the data corresponding to the read request.

7. The method of claim 1 further comprising transmitting the write request to the memory device at he second node after the read data is received at the first node.

8. The method of claim 7 further comprising:
   receiving a write acknowledgement from the second node after the write request has been completed; and
   transmitting the write acknowledgement to the first node.

9. A method comprising:
   receiving a write request from a first processor node in a multi-node computer system via a point-to-point cache coherent interface to write data to a memory device at a second processor node, the interface comprising two or more layers having a separate set of protocol functions;
   receiving a read request from a third processor node via the interface to read data from the memory device;
   detecting the read request and write request at conflict detection circuitry; and
   writing the data from the first processor node to the memory device.

10. The method of claim 9 further comprising transmitting a retry request to the third node upon detecting the read and write conflict.

11. The method of claim 10 further comprising:
   receiving an acknowledgement that the write request has been completed;
   receiving a second read request from the third node to read data from the memory device; and
   transmitting data corresponding to the read request from the memory device to the third node.

12. The method of claim 11 further comprising transmitting a snoop result to the third node after receiving the second read request.

13. A computer system comprising:
   a first processor node;
   a point-to-point cache coherent interface, coupled to the first processor node, comprising two or more layers, Each layer having a separate set of protocol functions;
   a scalability port (SP) switch coupled to the interface;
   a second processor node coupled to the SP switch; and a third processor node coupled to the SP switch wherein the first processor node, the second processor node and he SP switch comprise a conflict detection mechanism that detects conflicting request from the first processor node and the second processor node to access a memory device within the third processor node.

14. The computer system of claim 13 wherein the conflict detection mechanism detects conflicts been a read request to read data from the memory device within the third processor nod and a write request to write data to the memory device within the third processor node.

15. The computer system of claim 13 wherein the first, second and third processor nodes each comprise:
   a first central processing unit (CPU);
   a second CPU;
   a system node controller coupled to the first and second CPUs; and
   a memory device coupled to the system node controller.

16. The computer system of claim 15 wherein each system node controller comprises:
   a SP interface;
   an incoming request buffer (IRB) coupled to the SP interface; and
   an outgoing request buffer (ORB) coupled to the IRB and the SP interface.

17. The computer system of claim 16 wherein each system node controller further comprises:
   a memory controller coupled to the IRB and the ORB; and
   a bus interface coupled to the IRB and the ORB.

18. The computer system of claim 16, wherein each system node controller comprises: an incoming request buffer (IRB) that is larger than the outgoing request buffer (ORB).

19. The computer system of claim 13 wherein the SP switch comprises:
   a SP interface;
   a snoop pending table (SPT) coupled to the SP interface; and
   a snoop filter coupled to the SPT and the SP interface.

20. The computer system of claim 19 wherein the SPT detects requests by the first processor node and the second processor node to access the same line in the memory device within the third processor node.

21. The computer system of claim 13 further comprising an input/output (I/O) node coupled to the SP switch.

* * * * *